C. Cleminshaw,
Water Filter,
N°46,079.      Patented Jan.31, 1865.
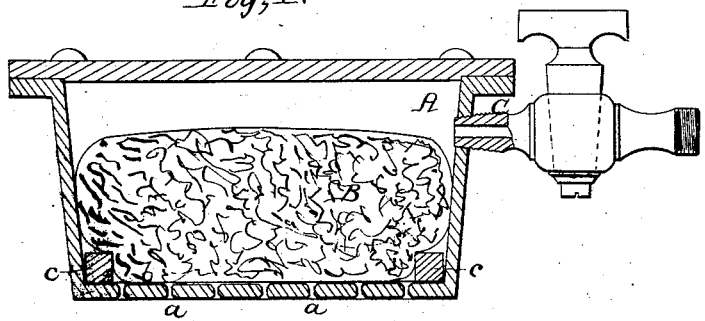
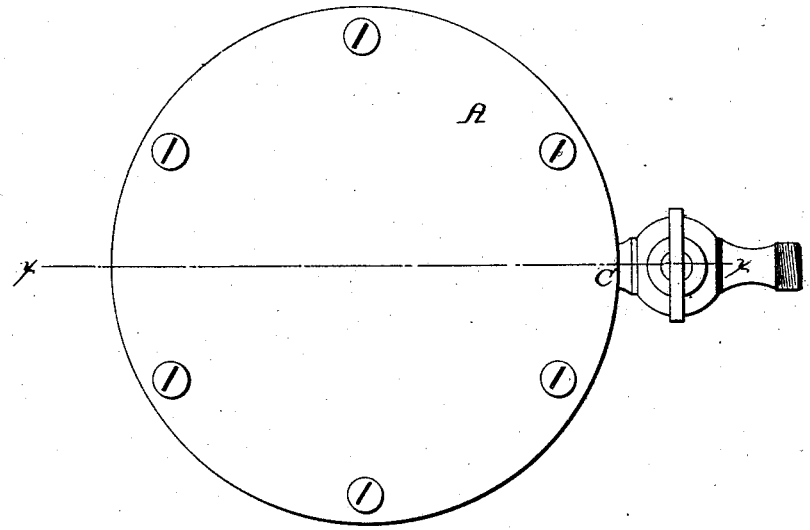
Witnesses;
C. L. Topliff
Theo Zusch
Inventor;
C. Cleminshaw
per Munn & Co
Attorneys

UNITED STATES PATENT OFFICE.

CHARLES CLEMINSHAW, OF TROY, NEW YORK.

IMPROVEMENT IN FILTERS.

Specification forming part of Letters Patent No. 46,079, dated January 31, 1865.

*To all whom it may concern:*

Be it known that I, C. CLEMINSHAW, of Troy, in the county of Rensselaer and State of New York, have invented a new and useful Improvement in Filtering Cider; and I do hereby declare that the following is a full, clear, and exact description thereof, which will enable others skilled in the art to make and use the same, reference being had to the accompanying drawings, forming part of this specification, in which—

Figure 1 is a vertical central section of my invention; Fig. 2, a plan or top view of the same.

Similar letters of reference indicate like parts.

The usual plan consists simply in pouring the cider into a vessel having the filtering material at its bottom, the cider passing slowly through the filtering material by gravity only. The upper part of the filtering medium soon becomes foul and choked up, and requires to be removed, involving an outlay of time and causing a waste of the filtering material, a large amount of good being thrown away with the foul portion. My invention fully obviates this difficulty.

In carrying out my invention I employ a close vessel, A, of either wood or metal, in which the filtering material is placed. The bottom of this vessel is perforated with holes $a$, and over the holes $a$ $a$ a screen or canvas, $b$, secured to a hoop or ring, $c$, is fitted, the latter being packed tightly in A. (See Fig. 1.) Over this screen or canvas the sand or filtering medium B is placed; and C is a pipe provided with a faucet, which communicates with the upper part of the vessel A, and leads from a force-pump or other device capable of forcing the cider through the filtering medium. An ordinary force-pump may be employed for this purpose, and it will be seen at once that by this means the filtering process may be very rapidly performed, and the whole mass of filtering material in the vessel A rendered available in performing the desired work, owing to the pressure exerted upon the cider, for when the upper mass or layer of the filtering material becomes foul the cider will be forced through it to a clean layer below, and so on until the whole mass of filtering material becomes foul, whereas when gravity alone is depended upon for the passage of the cider through the filtering medium the operation of filtering soon becsmes checked on account of the upper layer or part of the medium becoming foul, and the latter requires either to be removed entirely or have its upper surface taken away, and this is attended with a waste of time, and also of filtering material, as a portion of good is invariably removed with the foul portion of the same.

By my improvement also the cider is not injured by exposure to the air, as is the case when the open filter is used.

While disclaiming the general idea of filtering by means of a forced current, I claim as new and desire to secure by Letters Patent—

The combination of the packing-ring $c$ with the close vessel A, filtering medium B, pipe C, screen $b$, and perforations $a$ $a$, arranged and operating as and for the purposes specified.

CHAS. CLEMINSHAW.

Witnesses:
H. A. SHERWOOD,
LUTHER POMEROY.